United States Patent
Brunhuber et al.

(10) Patent No.: US 9,550,261 B2
(45) Date of Patent: Jan. 24, 2017

(54) METHOD FOR RETROFITTING A GAS TURBINE POWER PLANT

(71) Applicant: Siemens Aktiengesellschaft, Munich (DE)

(72) Inventors: Christian Brunhuber, Auerbach (DE); Hermann Kremer, Liederbach (DE); Frank Strobelt, Nuremberg (DE); Nicolas Vortmeyer, Erlangen (DE); Gerhard Zimmermann, Hochstadt/Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 223 days.

(21) Appl. No.: 14/374,903

(22) PCT Filed: Dec. 12, 2012

(86) PCT No.: PCT/EP2012/075199
§ 371 (c)(1),
(2) Date: Jul. 26, 2014

(87) PCT Pub. No.: WO2013/124015
PCT Pub. Date: Aug. 29, 2013

(65) Prior Publication Data
US 2015/0033558 A1 Feb. 5, 2015

(30) Foreign Application Priority Data

Feb. 22, 2012 (DE) .................. 10 2012 202 729
May 16, 2012 (DE) .................. 10 2012 208 221

(51) Int. Cl.
*B23P 19/04* (2006.01)
*F23J 15/04* (2006.01)
*F23J 15/06* (2006.01)

(52) U.S. Cl.
CPC .............. *B23P 19/042* (2013.01); *F23J 15/04* (2013.01); *F23J 15/06* (2013.01); *F23J 2215/50* (2013.01);
(Continued)

(58) Field of Classification Search
CPC ........... B23P 19/042; F23J 15/06; F23J 15/02; F23J 15/04; F23J 2215/50; F12J 2219/40
See application file for complete search history.

(56) References Cited

U.S. PATENT DOCUMENTS 4,434,613 A * 3/1984 Stahl ...................... B01J 12/005
                                                        60/39.182
5,133,190 A * 7/1992 Abdelmalek ........ B01D 53/002
                                                        60/648

(Continued)

FOREIGN PATENT DOCUMENTS

DE 102008002870 A1 12/2008
DE 102007043331 A1 2/2009

(Continued)

*Primary Examiner* — Jason L Vaughan
(74) *Attorney, Agent, or Firm* — Beusse Wolter Sanks & Maire

(57) ABSTRACT

A method for retrofitting an already existing gas turbine power plant is provided. The method features at least the following steps: fluidically connecting a gas turbine to a flue gas duct which is suitable for conducting flue gas which is produced by the gas turbine; connecting the flue gas duct to a steam generating unit which is fluidically connected to a water-steam cycle, and via which water-steam cycle a power generating facility can be operated; fluidically connecting a CO2 separation apparatus to the flue gas duct for separating the CO2 from the flue gas in the flue gas duct; and electrically connecting the power generating facility to the CO2 separation apparatus, preferably for the essentially energy-autonomous operation of the CO2 separation apparatus.

18 Claims, 2 Drawing Sheets

(52) U.S. Cl.
CPC ......... *F23J 2219/40* (2013.01); *F23J 2219/70* (2013.01); *Y02E 20/363* (2013.01); *Y10T 29/49229* (2015.01)

(56) References Cited

U.S. PATENT DOCUMENTS

| | | | | |
|---|---|---|---|---|
| 5,403,569 | A * | 4/1995 | Abdelmalek | B01D 53/002 423/220 |
| 7,559,977 | B2 * | 7/2009 | Fleischer | B01D 53/1475 110/215 |
| 7,874,140 | B2 * | 1/2011 | Fan | B01D 53/002 110/233 |
| 8,449,853 | B2 * | 5/2013 | Sceats | B01D 53/62 422/168 |
| 8,584,488 | B2 * | 11/2013 | Wilkinson | F25J 1/0022 62/618 |
| 8,726,628 | B2 * | 5/2014 | Wichmann | F01K 23/10 60/39.5 |
| 8,747,520 | B2 * | 6/2014 | Bearden | B01D 53/002 95/117 |
| 8,834,609 | B2 * | 9/2014 | Joh | B01D 53/1425 95/165 |
| 9,155,991 | B2 * | 10/2015 | Ogawa | B01D 53/1475 |
| 9,233,336 | B2 * | 1/2016 | Iijima | B01D 53/1425 |
| 2001/0037728 | A1 | 11/2001 | Schimkat | |
| 2008/0309087 | A1 | 12/2008 | Bowman | |
| 2011/0033359 | A1 | 2/2011 | Buddenberg | |
| 2012/0090328 | A1 | 4/2012 | Agostinelli | |
| 2012/0255173 | A1 | 10/2012 | Grumann | |
| 2012/0255305 | A1 * | 10/2012 | Iijima | B01D 53/1425 60/670 |
| 2012/0304644 | A1 | 12/2012 | Grumann | |

FOREIGN PATENT DOCUMENTS

| | | | | |
|---|---|---|---|---|
| DE | CA 2779363 A1 * | 5/2011 | | F01D 13/02 |
| DE | 102011115365 A1 | 4/2012 | | |
| DE | 102012202703 A1 | 8/2013 | | |
| EP | 1138369 A1 | 10/2001 | | |
| WO | 2008090166 A1 | 7/2008 | | |
| WO | 2011051493 A2 | 5/2011 | | |
| WO | 2011051494 A2 | 5/2011 | | |
| WO | 2011120754 A2 | 10/2011 | | |

* cited by examiner

METHOD FOR RETROFITTING A GAS TURBINE POWER PLANT

CROSS REFERENCE TO RELATED APPLICATIONS

This application is the US National Stage of International Application No. PCT/EP2012/075199 filed Dec. 12, 2012, and claims the benefit thereof. The International Application claims the benefit of German Application No. 102012208221.2 filed May 16, 2012 and German Application No. 102012202729.7 filed Feb. 22, 2012. All of the applications are incorporated by reference herein in their entirety.

FIELD OF INVENTION

The present invention relates to a method for retrofitting an already existing gas turbine power plant which is to be equipped with a $CO_2$ separation apparatus.

BACKGROUND OF INVENTION

The separation of $CO_2$ gas from an exhaust gas low of a combustion system allows a reduced emission of $CO_2$ into the atmosphere. This, especially against the background of state and interstate regulated reductions of emitted $CO_2$, is an economical cost factor which is increasingly taken into consideration in the commercial future plans of many undertakings.

At the same time, such a $CO_2$ separation method also enables the directed collection of $CO_2$ gas which in turn can be fed as a source material to special process engineering operations. Consequently, $CO_2$ can also be seen as a valuable base material. The "enhanced oil recovery" (EOR) process, for example, constitutes such a process for the technical use of $CO_2$, in which $CO_2$ is injected into underground rock layers of oil deposits so that it is released in the crude oil which is present in these oil deposits and at the same time brings about a viscosity reduction of the crude oil. On account of the viscosity reduction, the flowability of the oil is significantly increased and can therefore be extracted more easily from the rock structures with lower flow resistance. At the same time, the $CO_2$ which is injected into the underground oil deposits serves for increasing the ambient pressure in the oil deposits, as a result of which a directional flow behavior of the crude oil, which has been changed with regard to its viscosity, can be achieved.

The $CO_2$ gas which is introduced into the oil deposits currently originates predominantly from refining processes of the natural gas producing industry. Over recent years, it has been proved, however, that the costly transporting of $CO_2$ produced in this way from the refinery sites to the oil deposits requires a sometimes large and expensive piping network. The provision of such a network, however, in turn greatly increases the costs for the $CO_2$ and therefore the costs for the crude oil which is extracted with the aid of the $CO_2$.

In this respect, a changeover has already been made in part to locating the natural gas processing in local proximity to the oil deposits. Since the crude oil extraction typically also delivers natural gas as a by-product, the natural gas which is produced there can be processed comparatively cost effectively and consequently $CO_2$ can be produced comparatively more cost effectively.

Further efforts are directed towards separating $CO_2$ from the combustion systems, which are operated for the oil extraction, in the regions of the oil extraction for power generation. The combustion systems, on account of the strong presence of natural gas in the regions of crude oil extraction, are mostly constructed as gas turbines. To this end, the combustion system is equipped with a suitable $CO_2$ separation apparatus for the operation, wherein the $CO_2$ which is produced by means of the $CO_2$ separation apparatus can be further processed. Also, the $CO_2$ which is produced in this way can be pumped under pressure directly into the oil deposits for improved oil yield. The equipping of the combustion system with a $CO_2$ separation apparatus is typically carried out in this case by both components being designed and interconnected in an overall system, wherein both components are adapted to the respectively other component with regard to their operation.

Even if the combustion system, on account of the oxidative combustion taking place in it, can produce $CO_2$ in comparatively large quantities, its separation in a downstream $CO_2$ separation apparatus is possible only by means of an energy-intensive $CO_2$ separation process. This additional consumption of energy on the one hand reduces the cost effectiveness of the $CO_2$ which is produced in this way and, in addition, also appreciably reduces the overall efficiency of the system consisting of combustion system and $CO_2$ separation apparatus.

Consequently, it is desirable to propose a suitable method for retrofitting an already existing gas turbine power plant with a $CO_2$ separation apparatus, wherein the retrofitting method shall not limit the power output, especially the electric power output of the gas turbine. It is also desirable to retrofit an already existing gas turbine power plant in such a way that an efficient separation of $CO_2$ from the flue gas of the gas turbine power plant is made possible. Retrofitting of a gas turbine power plant which allows an essentially energy-autonomous operation of a $CO_2$ separation apparatus which is fluidically connected thereto is to be especially preferably made possible.

SUMMARY OF INVENTION

These objects upon which the invention is based are achieved by means of a method for retrofitting an already existing gas turbine power plant according to the independent claims.

In particular, the invention is achieved by means of a method for retrofitting an already existing gas turbine power plant, wherein the method features at least the following steps:—fluidically connecting a gas turbine (5) to a flue gas duct (2) suitable for conducting flue gas which is produced by the gas turbine (5);—connecting the flue gas duct (2) to a steam generating unit (10) which is fluidically connected to a water-steam cycle (11), and via which water-steam cycle (11) a power generating facility (12) can be operated;—fluidically connecting a CO2 separation apparatus (20) to the flue gas duct (2) for separating the CO2 from the flue gas in the flue gas duct (2), and—electrically connecting the power generating facility (12) to the CO2 separation apparatus (20), preferably for the essentially energy-autonomous operation of the CO2 separation apparatus (20).

In this case, and subsequently, an electrical connection is to be understood in its broadest possible sense. In particular, an electrical connection is to comprise a direct, as well as an indirect, electrical connection.

Also, it is possible according to the embodiment that the power generating facility is connected to additional electric energy-consuming components so that these can be operated in an economical manner. Such components are partially described further below.

In this case, and subsequently, the term gas turbine power plant is also to be understood in a broad form. In particular, gas turbine power plants according to the invention also include gas turbine-based combustion systems which are used in the oil extraction industry as well as in the chemical industry. The gas turbine power plants according to the invention, however, are not provided in a combined cycle arrangement but are designed as a single-cycle or simple-cycle power plant.

In addition, the gas turbine power plants according to the invention are conventional and not adapted to later extensions in a way that they could be equipped with a $CO_2$ separation apparatus without further technical modifications, for example, i.e. the gas turbine power plants according to the invention are particularly not capture-ready power plants.

According to the invention, the method for retrofitting an already existing gas turbine power plant allows a suitable connection of various functional components of the power plant in such a way that an energy-efficient operation with simultaneous separation of $CO_2$ from the flue gas of the gas turbine can be achieved. To this end, the gas turbine is first provided with a flue gas duct in such a way that the flue gas which is produced by the gas turbines during combustion can be suitably discharged. By connecting the flue gas duct to a steam generating unit, the heat which is contained within the flue gas can be transferred in a suitable manner to a water-steam cycle. This water-steam cycle, moreover, is designed for operating a power generating facility.

After heat transfer has been carried out by means of the steam generating unit, the flue gas is to be fed to a $CO_2$ separation apparatus, for which reason fluidically connecting the flue gas duct to such a $CO_2$ separation apparatus has to be undertaken. As a result of electrically connecting the power generating facility to the $CO_2$ separation apparatus, the electric energy-consuming components of the $CO_2$ separation apparatus can be supplied with electric energy in a particularly energy-efficient manner. The electric energy, which originates from extraction of the heat from the flue gas by means of the steam generating unit, consequently allows operation of the $CO_2$ separation apparatus without having to fall back on the electric energy which has been generated by operation of the gas turbine in the power plant.

Above all, the method for retrofitting an already existing gas turbine power plant makes provision for an additional power generating source, specifically the power generating facility which is especially provided solely for the provision of electric energy for the components of the $CO_2$ separation apparatus.

Furthermore, it is naturally also possible to make the electric energy which is generated in this way also available to even more electric energy-consuming components which suitably interact either with the flue gas duct or with the components which are connected thereto.

The retrofitting of an already existing gas turbine power plant allows an extension of the power plant with regard to its functionality. Thus, during operation of the gas turbine power plant not only electric energy is generated but $CO_2$ is also accumulated in a directed manner and can be made available for oil extraction, for example. To this end, the $CO_2$ is discharged from the $CO_2$ separation apparatus and fed to the oil deposits in a suitable form. Since gas turbine power plants are typically also operated in the regions of oil extraction for providing electric energy, $CO_2$ can be produced directly on site, i.e. in proximity to the oil deposits. Consequently, an energy-inefficient and cost-intensive transporting of $CO_2$ over longer distances is dispensed with.

Moreover, the gas turbine power plants are not restricted with regard to their electric efficiency when retrofitted so that these, without limitations, can still deliver the quantities of electric energy for which they were originally designed. The electric energy which is required for $CO_2$ separation can be provided totally, or at least predominantly, by means of the power generating facility.

According to a first especially preferred embodiment of the method according to the invention for retrofitting, it is provided that the step of electrically connecting the power generating facility to the $CO_2$ separation apparatus comprises, or is, a connection to at least one pump of the $CO_2$ separation apparatus. Accordingly, the method allows operation of the pumps incorporated by the $CO_2$ separation apparatus by means of the quantities of electric energy which is generated by means of the power generating facility. The consumption of electric energy which is generated elsewhere is therefore unnecessary. In this case, reference is also to be made to the fact that in a $CO_2$ separation apparatus pumps can typically be the components which consume the most electric energy. By supplying these pumps alone with electric energy from the power generating facility the overall efficiency of the gas turbine power plant comprising the $CO_2$ separation apparatus can be noticeably increased.

According to a further embodiment of the method according to the invention it is provided that the $CO_2$ separation apparatus includes at least one absorber section and at least one desorber section, the two being fluidically interconnected, wherein especially the step of fluidically connecting a $CO_2$ separation apparatus to the flue gas duct comprises, or is, a fluidic connection to the at least one absorber section. According to the embodiment, the $CO_2$ separation apparatus therefore includes an absorber section in which the $CO_2$ is washed out of the flue gas of the gas turbine typically by means of a scrubbing agent. For recovery of the scrubbing agent, or for separation of the thus removed $CO_2$ from the scrubbing agent, the scrubbing agent is thermally treated in the desorber section. The thermal treatment typically requires temperatures of at least 100° C. or above and after desorption of the $CO_2$ from the scrubbing agent allows a directed separation of both substances. The gaseous $CO_2$ can be discharged in a suitable form. The scrubbing agent is made available in turn for further $CO_2$ absorption in the absorber section and is once again fed to this.

A detailed representation of the individual processes in such a $CO_2$ separation apparatus, which includes at least one absorber section and at least one desorber section, can be gathered from DE 102012202703.3.

This document, moreover, is also to be expressly incorporated by reference into the present application.

According to a further embodiment of the method according to the invention, in addition a step of thermally connecting the water-steam cycle to the $CO_2$ separation apparatus, especially a step of thermally connecting the water-steam cycle to a desorber section of the $CO_2$ separation apparatus, is also included. The thermal connection allows thermal energy to be extracted from the water-steam cycle and fed to the $CO_2$ separation apparatus. The $CO_2$ separation apparatus can be operated in a particularly energy-efficient manner as a result of providing the additional thermal energy. In particular, if the $CO_2$ separation apparatus includes at least one absorber section and also at least one desorber section, a thermal dissipation of thermal energy from the water-steam cycle is suitable for operation of the desorber section. Since the desorber section has to be supplied with thermal heat during operation, the thermal energy which is extracted from the water-steam cycle can consequently be made available in a suitable manner to the desorber section. At the same time, the thermal connection of the water-steam cycle to the CO2 separation apparatus can constitute a suitable heat sink in the water-steam cycle which in the first place enables an operation of the steam generating unit which is connected to the water-steam cycle.

According to a further embodiment of the method according to the invention, a further step of fluidically connecting the CO2 separation apparatus to a CO2 supply network, which is particularly designed as a step of fluidically connecting a desorber section of the CO2 separation apparatus to a CO2 supply network, can be included. The CO2 supply network in this case serves for supplying the oil extraction industry with suitable quantities of CO2. As a result of a direct feed of the CO2 into the supply network in question, the CO2 can be made available to the oil extraction industry in a direct and especially inexpensive manner.

According to a further embodiment of the method according to the invention, in addition a cooling circuit is fluidically connected to the water-steam cycle and its electric energy-consuming components are electrically connected to the power generating facility, or its thermal energy is made available to the CO2 separation apparatus. This cooling circuit can be designed as a thermal connection of the water-steam cycle to the CO2 separation apparatus, for example, as described above. This cooling circuit can also be designed as an external cooling circuit which can provide refrigeration capacity. In particular, the cooling circuit can also comprise cooling towers which are suitable for supplying the cooling circuit with suitable refrigeration capacity.

According to a further preferred embodiment of the invention, in addition a refrigerating machine is fluidically connected downstream to the CO2 separation apparatus, which refrigerating machine is designed for condensing water out of the gas flow issuing from the CO2 separation apparatus during operation. The refrigerating machine consequently enables the provision of liquid water, which is discharged from the CO2 separation apparatus, during operation. The water which is condensed out in the refrigerating machine in this case originates for the most part from the combustion process in the gas turbine, in which fuel, preferably natural gas, is combusted, forming CO2 and water. On account of the comparatively large quantities of natural gas which are consumed in the power plant during operation of the gas turbine, water can be produced in industrially usable quantities. This, after being condensed out in the refrigerating machine, is made available for further process engineering or power plant engineering operations. It is also conceivable that the water which is condensed out in this way can be passed on for human utilization.

According to a further preferred embodiment of the method according to the invention, a heat exchanger is connected to the flue gas duct and is designed for transferring heat from the flue gas in the flue gas duct to the gas flow issuing from the CO2 separation apparatus. Consequently, on the one hand heat can be extracted from the flue gas which is fed to the CO2 separation apparatus, as a result of which it can be cooled to a temperature which is suitable for operation of the CO2 separation apparatus. At the same time, heat can be fed to the gas flow issuing from the CO2 separation apparatus so that this gas flow can discharge from a chimney, for example, by means of convective air circulation. In this case, the temperature level of the flue gas which is fed to the CO2 separation apparatus is typically between 30° C. and 100° C., preferably between 30° C. and 50° C., wherein this temperature level basically remains constant during passage of the flue gas through the CO2 separation apparatus. After thermal treatment of the gas flow, issuing from the CO2 separation apparatus, in a previously described refrigerating machine, the temperature can be lowered to about 10 to 25° C. On account of this relatively low temperature level in comparison to the ambient temperature, additional heat has to be added to the gas flow so that by means of a chimney, for example, it can be convectively fed to air layers of the environment which lie above ground level.

According to a further aspect of the method according to the invention for retrofitting, a cooling device is connected to the flue gas duct, which cooling device is provided especially between the steam generating unit and the CO2 separation apparatus and is designed for extracting heat from the flue gas which is present in the flue gas duct and for energetically supplying a refrigeration process therewith. The cooling device is consequently suitable for providing additional cooling capacity. This cooling capacity can be demanded by components which are connected to the gas turbine power plant or can also be made available to additional external components. The cooling device is especially designed as an adsorption refrigerating machine, as an absorption refrigerating machine and/or as a steam-jet refrigerating machine. Depending upon the demanded cooling capacity, a greater or lesser quantity of thermal energy is extracted from the flue gas in the flue gas duct.

According to a further preferred embodiment of the invention, the power generating facility comprises a back-pressure turbine which is coupled to a generator. Since such a back-pressure turbine can be used in a particularly energy-efficient manner for electric power generation, provision is especially preferably made for such a back-pressure turbine.

According to a further embodiment of the invention, the gas turbine is not modified with regard to its electric power output when being retrofitted. This circumstance is sometimes essential for advantageous efficiency during operation of the system consisting of gas turbine and CO2 separation apparatus.

It is also possible that according to a further embodiment the operating parameters of the gas turbine are not adjusted with regard to the retrofit, especially with regard to the operation of the steam generating unit and the operation of the CO2 separation apparatus. Consequently, the operation of the CO2 separation apparatus requires relatively few adjustments, or no adjustments, of the process during operation of the gas turbine. The CO2 production by means of the CO2 separation apparatus is therefore carried out basically independently of the operation of the gas turbine and temporally downstream. This embodiment consequently enables a simplified connection between gas turbine and CO2 separation apparatus.

In the following, the invention shall be explained with reference to further figures. In this case, the figures show only schematic representations which shall not limit the concrete realization of the invention according to one embodiment.

In addition, the figures are to be understood only by way of example and therefore in turn do not limit the generality in which the present invention is claimed.

DETAILED DESCRIPTION OF INVENTION

Figure 1:
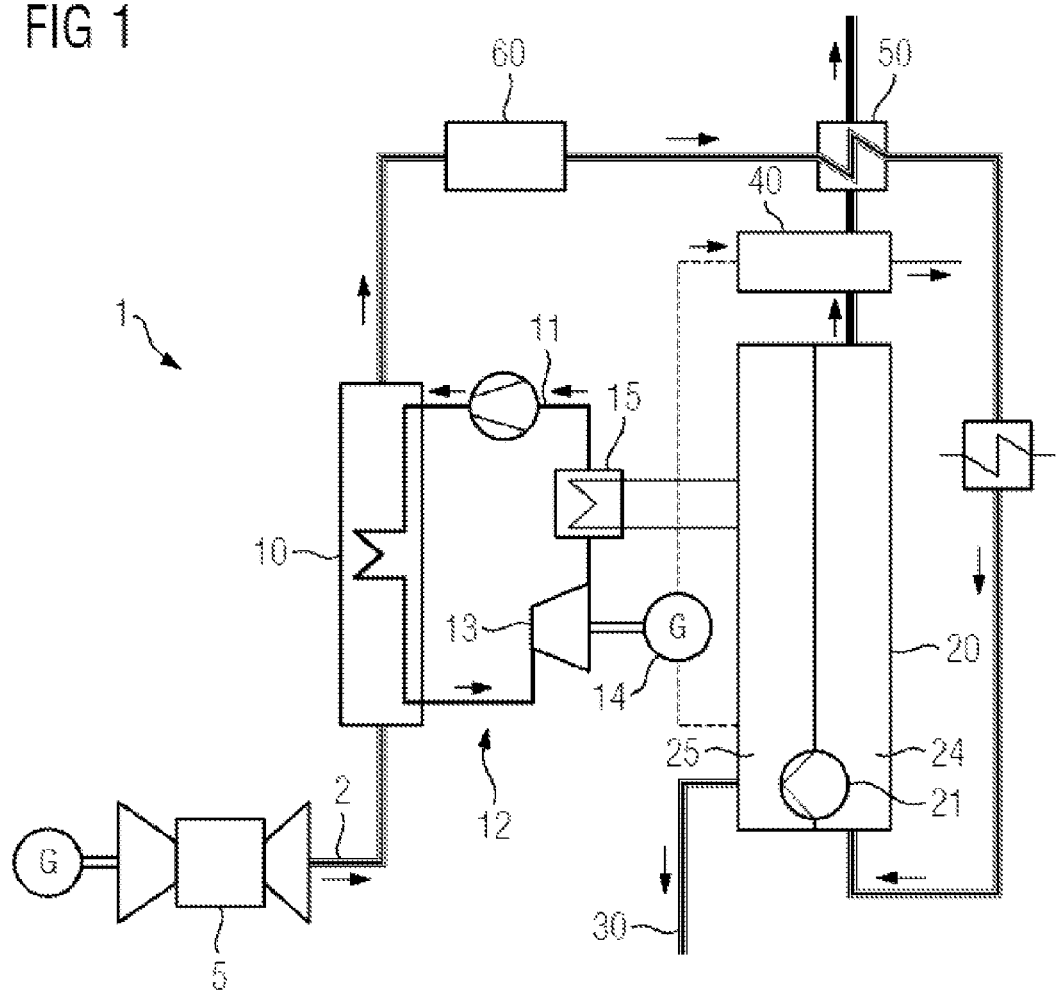
FIG. 1 shows a first embodiment of the system which is created by means of the inventive method for retrofitting an already existing gas turbine power plant.

FIG. 1 shows a first embodiment of a system, having gas turbine 5 and $CO_2$ separation apparatus, which is created by means of the method according to the invention for retrofitting an already existing gas turbine power plant 1. To this end, a flue gas duct 2 has been connected to a gas turbine 5 and is suitable for discharging the flue gas which issues from the gas turbine 5. The flue gas is directed by means of the flue gas duct 2 to a steam generating unit 10 which by means of thermal contact extracts thermal energy from the flue gas and transfers this thermal energy to a water-steam cycle 11. The fluid flow in the water-steam cycle 11 is maintained by a pump (not provided with a designation in the present case) and after passing through the steam generating unit 10 is fed to a back-pressure turbine 13. By expansion in the back-pressure turbine 13 and also by release of thermal energy for providing mechanical energy in the back-pressure turbine 13, a generator 14, connected to said back-pressure turbine 13, is driven. The electric energy which is generated during operation of the generator 14 is fed via a suitable electrical connection to a separation apparatus 20. The water-steam cycle 11, moreover, has a cooling circuit 15 which is designed for drawing heat from the water-steam cycle 11 and feeding this to the separation apparatus 20. The $CO_2$ separation apparatus 20 can use this heat for heating suitable parts, especially for heating suitable parts in a desorber section 25. At the same time, the cooling circuit 15 within the water-steam cycle 11 constitutes a suitable heat sink.

After release of thermal energy by means of the flue gas to the steam generating unit 10, the flue gas in the flue gas duct 2 comes into thermal contact with a cooling device 60 and makes this heat capacity available for producing refrigeration capacity. The cooling device 60 is especially constructed as an adsorption or absorption refrigerating machine.

Fluidically downstream, thermal energy is also extracted from the flue gas in the flue gas duct 2 by means of a heat exchanger 50, wherein the heat which is extracted in this way is transferred to the gas flow issuing from the $CO_2$ separation apparatus 20. The heat is especially transferred to a gas flow issuing from a refrigerating machine 40, which refrigerating machine 40 is fluidically connected downstream to the $CO_2$ separation apparatus 20.

If, as a result of the previously described thermal conditioning steps, the flue gas in the flue gas duct should still not have been sufficiently cooled for operation of the $CO_2$ separation apparatus 20, it is also possible to provide additional components which are connected to the flue gas duct 2 and can extract heat from the flue gas flowing therein.

The flue gas which is thermally conditioned in this way is fed to the $CO_2$ separation apparatus 20. The flue gas is especially fed to an absorber section 24 which is fluidically connected to a desorber section 25. In the absorber section 24, the inflowing flue gas is suitably treated with a scrubbing agent so that the $CO_2$ is separated from the flue gas. After separation has been carried out, the compound consisting of scrubbing agent and $CO_2$ is fed to the desorber section 25 by means of a suitable pump 21, wherein the desorber section 25 thermally treats the compound of scrubbing agent and $CO_2$ in such a way that both substances are separated. This is carried out at temperatures of approximately 100° C. or above. After separation of both substances has been carried out, the $CO_2$ can be transferred via a suitable discharge line from the $CO_2$ separation apparatus 20 into a $CO_2$ supply network 30. The regenerated scrubbing agent is fed in turn from the desorber section to the absorber section 24 in order to again absorb, i.e. wash out, $CO_2$ there.

The gas flow issuing from the $CO_2$ separation apparatus 20 is fed according to the embodiment to a refrigerating machine 40 which again extracts thermal energy from the gas flow to such an extent that the water present in the gas flow condenses out. Consequently, the dew point for water of the gas flow issuing from the $CO_2$ separation apparatus 20 is fallen short of.

The condensed water can be extracted via a suitable drain line. The drain line can also feed the water for intermediate storage to a storage tank, which is not additionally shown, from which a desired quantity of water can also be extracted when the refrigerating machine 40 is not in a position to deliver the demanded quantities at short notice. So, the quantity of liquid water which is produced by the refrigerating machine 40, for example, can also depend upon the ambient temperature. If, for example, water is required to an increasing extent in the event of relatively high ambient temperature, such as during the daytime with full exposure to sunlight, it is advisable to collect water at a time of day at which the ambient temperatures are lower and consequently the provision of liquid water by means of the refrigerating machine 40 can be carried out more efficiently. This is the case during the night-time hours, for example. The water which is collected in this way can especially be fed back again into the $CO_2$ separation apparatus 20 during a daytime operation with full exposure to sunlight in order to compensate liquid losses there.

For operation of the refrigerating machine 40, electric energy can be supplied to this via a suitable supply line. This electric energy can be provided especially by means of the generator 14 which interacts with the back-pressure turbine 13 for power generation.

The gas issuing from the refrigerating machine 40 is again thermally conditioned in the heat exchanger 50 so that its temperature level is increased. During this, heat from the flue gas which is provided for feeding to the $CO_2$ separation apparatus 20 is transferred to the gas flow issuing from the refrigerating machine 40. A transfer of heat is necessary since the gas issuing from the refrigerating machine 40 does not have sufficient heat in order to be able to be discharged via a chimney, for example.

Figure 2:
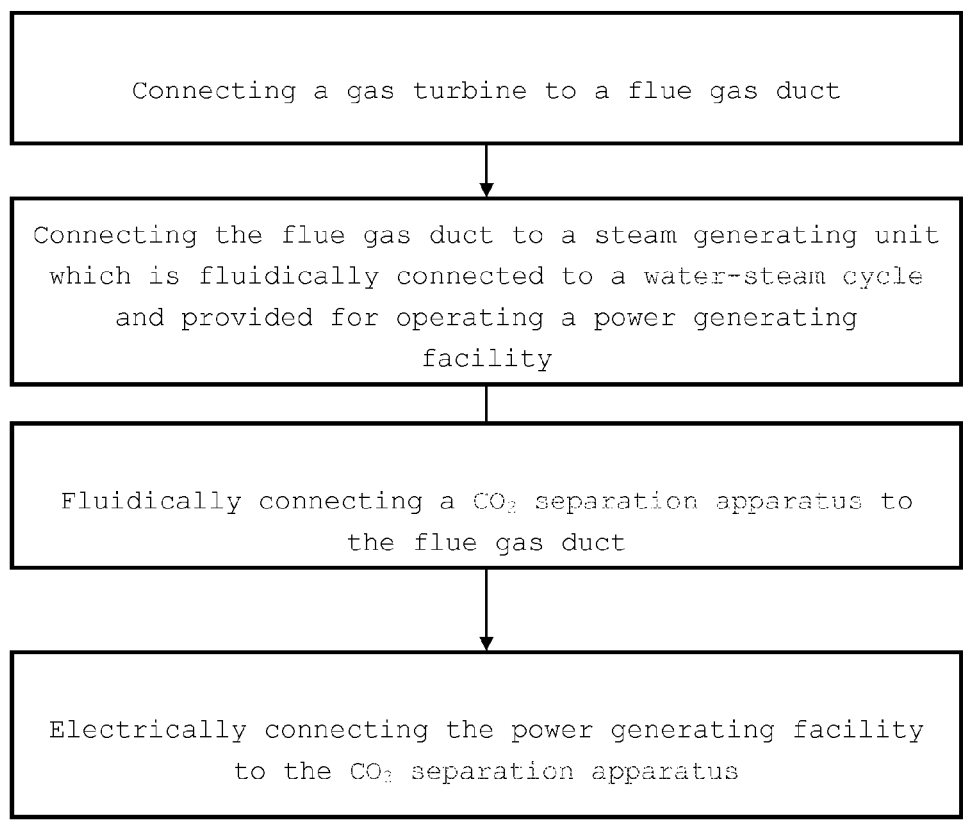
FIG. 2 shows a flow diagram for representing the sequence of individual steps according to an embodiment of the method according to the invention.

FIG. 2 shows a flow diagram for explaining a first embodiment of the method according to the invention for retrofitting an already existing gas turbine power plant 1. According to a first step, a gas turbine 5 is connected to a flue gas duct 2. This connection enables the directed discharging and conducting of the flue gas issuing from the gas turbine 5. According to a second step, the flue gas duct 2 is connected to a steam generating unit 10 which is fluidically connected to a water-steam cycle 11 and is provided for operating a power generating facility 12. Consequently, thermal heat can be extracted from the flue gas in the flue gas duct 2 and can be transferred to the water in the water-steam cycle 11. This thermal heat is converted in a thermal water-steam process into electric energy by means of the power generating facility 12. According to a third step, the flue gas duct is fluidically connected to a $CO_2$ separation apparatus 20, wherein the $CO_2$ separation apparatus 20 is preferably suitable for removing $CO_2$ from the flue gas. The removal enables the directed collection and also the directed discharge of the $CO_2$ which is produced in this way. According to a further subsequent step of the method according to the embodiment, the power generating facility 12 is electrically connected to the $CO_2$ separation apparatus 20. Consequently, the electrical components which are comprised by the $CO_2$ separation apparatus can be supplied and operated by means of the electric current from the power generating facility 12. This in turn increases the efficiency of the overall power plant process since no electric energy has to be supplied from outside for operating the electrical components of the $CO_2$ separation apparatus 20. Rather, the energy for operating the $CO_2$ separation apparatus 20 originates from the flue gas of the gas turbine 5, which would anyway be fed in an unused state to the environment. This especially relates to gas turbines 5 which are operated in the sense of a single-cycle arrangement.

Further embodiments are gathered from the dependent claims.

The invention claimed is:

1. A method for retrofitting an already existing gas turbine power plant, wherein the method comprises at least the following:
   fluidically connecting a field run, simple cycle gas turbine to a flue gas duct suitable for conducting flue gas produced by the gas turbine;
   connecting the flue gas duct to a steam generating unit which is fluidically connected to a water-steam cycle of a power generating facility;
   fluidically connecting a CO2 separation apparatus to the flue gas duct for separating CO2 from the flue gas in the flue gas duct, and;
   electrically connecting the power generating facility to the CO2 separation apparatus, wherein electrical power generated by the water-steam cycle of the power generation facility alone powers the CO2 separation apparatus.

2. The method for retrofitting as claimed in claim 1, wherein the step of electrically connecting the power generating facility to the CO2 separation apparatus comprises electrically connecting the power generating facility to at least one pump of the CO2 separation apparatus.

3. The method for retrofitting as claimed in claim 1, wherein the CO2 separation apparatus includes at least one absorber section and at least one desorber section that is fluidically interconnected with the at least one absorber section.

4. The method for retrofitting as claimed in claim 3, wherein the step of fluidically connecting the CO2 separation apparatus to the flue gas duct comprises fluidically connecting to the at least one absorber section of the CO2 separation apparatus.

5. The method for retrofitting as claimed in claim 1, further comprising thermally connecting the water-steam cycle to the CO2 separation apparatus.

6. The method for retrofitting as claimed in claim 5, wherein the water-steam cycle is thermally connected to a desorber section of the CO2 separation apparatus.

7. The method for retrofitting as claimed in claim 1, further comprising fluidically connecting the CO2 separation apparatus to a CO2 supply network.

8. The method for retrofitting as claimed in claim 7, wherein a desorber section of the CO2 separation apparatus is fluidically connected to the CO2 supply network.

9. The method for retrofitting as claimed in claim 1, further comprising fluidically connecting a cooling circuit to the water-steam cycle, electrically connecting electric energy-consuming components of the cooling circuit to the power generating facility, and transferring thermal energy from water in the water-steam cycle to the CO2 separation apparatus.

10. The method for retrofitting as claimed in claim 1, further comprising fluidically connecting a refrigerating machine downstream to the CO2 separation apparatus, the refrigeration machine designed for condensing water out of a gas flow issuing from the CO2 separation apparatus during operation.

11. The method for retrofitting as claimed in claim 1, further comprising connecting a heat exchanger to the flue gas duct, the heat exchanger designed for transferring heat from the flue gas in the flue gas duct to a gas flow issuing from the CO2 separation apparatus.

12. The method for retrofitting as claimed in claim 1, further comprising connecting to the flue gas duct a cooling device that performs a refrigeration process, the cooling device designed for extracting heat from the flue gas and using the heat for energetically supplying the refrigeration process.

13. The method for retrofitting as claimed in claim 12, wherein the cooling device is connected to the flue gas duct between the steam generating unit and the CO2 separation apparatus.

14. The method for retrofitting as claimed in claim 1, wherein the power generating facility comprises a back-pressure turbine which is connected to a generator.

15. The method for retrofitting as claimed in claim 1, wherein the gas turbine is not modified with regard to its electric power output when being retrofitted.

16. The method for retrofitting as claimed in claim 1, wherein the operating parameters of the gas turbine are not adjusted with regard to the retrofit.

17. The method for retrofitting as claimed in claim 16, wherein the operating parameters of the gas turbine are not adjusted with regard to the operation of the steam generating unit and to the operation of the CO2 separation apparatus.

18. The method for retrofitting as claimed in claim 1, further comprising treating all of the flue gas in the flue gas duct.

* * * * *